United States Patent
Sleeman et al.

(10) Patent No.: US 10,963,090 B2
(45) Date of Patent: Mar. 30, 2021

(54) FORCE AND POSITION DETERMINATION BASED ON CAPACITIVE SENSING

(71) Applicant: TouchNetix Limited, Hampshire (GB)

(72) Inventors: Peter Timothy Sleeman, Waterlooville (GB); Luben Hristov, Sofia (BG)

(73) Assignee: TouchNetix Limited, Hampshire (GB)

( * ) Notice: Subject to any disclaimer, the term of this patent is extended or adjusted under 35 U.S.C. 154(b) by 0 days.

(21) Appl. No.: 16/339,619

(22) PCT Filed: Oct. 2, 2017

(86) PCT No.: PCT/GB2017/052950
§ 371 (c)(1),
(2) Date: Apr. 4, 2019

(87) PCT Pub. No.: WO2018/065760
PCT Pub. Date: Apr. 12, 2018

(65) Prior Publication Data
US 2019/0258341 A1      Aug. 22, 2019

(30) Foreign Application Priority Data
Oct. 7, 2016   (GB) .................................. 1617060.7

(51) Int. Cl.
*G06F 3/041*  (2006.01)
*G06F 3/044*  (2006.01)

(52) U.S. Cl.
CPC .......... *G06F 3/0416* (2013.01); *G06F 3/0443* (2019.05); *G06F 3/0445* (2019.05);
(Continued)

(58) Field of Classification Search
CPC . G06F 2203/04105; G06F 2203/04107; G06F 2203/04112; G06F 3/0412; G06F 3/0416; G06F 3/044
See application file for complete search history.

(56) References Cited

U.S. PATENT DOCUMENTS

| | | | | |
|---|---|---|---|---|
| 7,684,953 | B2* | 3/2010 | Feist | ...................... H01C 10/12 |
| | | | | 702/139 |
| 8,519,281 | B2* | 8/2013 | Mizushima | ......... G06F 3/03547 |
| | | | | 178/18.06 |

(Continued)

FOREIGN PATENT DOCUMENTS

| EP | 3 054 381 A1 | 8/2016 |
|---|---|---|
| GB | 2533949 A | 7/2016 |

(Continued)

OTHER PUBLICATIONS

International Search Report and Written Opinion for corresponding Patent Application No. PCT/GB2017/052950 dated Nov. 6, 2017.

(Continued)

*Primary Examiner* — Michael J Jansen, II
(74) *Attorney, Agent, or Firm* — Renner, Otto, Boisseile & Sklar, LLP

(57) ABSTRACT

A sensing apparatus including a frame; a capacitive sensor comprising a sensing surface moveably mounted relative to the frame and configured to measure, as a function of time, characteristics of capacitive couplings between the sensing surface and a plurality of objects at different locations over the sensing surface; a displacement sensor configured to detect when there is a displacement of the sensing surface relative to the frame due to a displacement load applied to the sensing surface by one of the objects; and a processing element configured to identify which of the objects applied the displacement load based on changes in the measured characteristics of the capacitive couplings for the respective objects during a time period around when the displacement of the sensing surface is detected.

18 Claims, 3 Drawing Sheets

(52) U.S. Cl.
CPC .. *G06F 3/0447* (2019.05); *G06F 2203/04104* (2013.01); *G06F 2203/04105* (2013.01); *G06F 2203/04106* (2013.01)

(56) References Cited

U.S. PATENT DOCUMENTS

| | | | | |
|---|---|---|---|---|
| 9,542,031 B2* | 1/2017 | Shibata | | G06F 3/045 |
| 9,588,614 B2* | 3/2017 | Roberts | | G06F 3/0416 |
| 9,612,101 B2* | 4/2017 | Sleeman | | G06F 3/0446 |
| 9,639,204 B2* | 5/2017 | Kim | | G06F 3/0488 |
| 9,652,093 B2* | 5/2017 | Roberts | | G06F 3/0416 |
| 10,048,789 B2* | 8/2018 | Filiz | | G06F 3/04166 |
| 10,073,559 B2* | 9/2018 | Kim | | G06F 3/0446 |
| 10,175,833 B2* | 1/2019 | Wang | | G06F 3/0418 |
| 10,379,657 B2* | 8/2019 | Filiz | | G06F 3/0416 |
| 10,503,329 B2* | 12/2019 | Sleeman | | G06F 3/0445 |
| 10,558,305 B2* | 2/2020 | Roberts | | G06F 3/0448 |
| 10,605,628 B2* | 3/2020 | Sleeman | | G01D 5/241 |
| 10,698,519 B2* | 6/2020 | Park | | G06F 3/041 |
| 10,739,899 B2* | 8/2020 | Filiz | | G06F 3/04166 |
| 2007/0271048 A1* | 11/2007 | Feist | | H01C 10/12 |
| | | | | 702/65 |
| 2011/0139517 A1* | 6/2011 | Mizushima | | H01H 25/041 |
| | | | | 178/18.06 |
| 2012/0086666 A1* | 4/2012 | Badaye | | G06F 3/0416 |
| | | | | 345/174 |
| 2013/0141342 A1* | 6/2013 | Bokma | | G06F 3/0202 |
| | | | | 345/173 |
| 2015/0028894 A1* | 1/2015 | Sleeman | | G06F 3/0446 |
| | | | | 324/662 |
| 2015/0153951 A1 | 6/2015 | Kim et al. | | |
| 2015/0234527 A1* | 8/2015 | Roberts | | G06F 3/0416 |
| | | | | 345/174 |
| 2015/0242028 A1* | 8/2015 | Roberts | | G06F 3/0446 |
| | | | | 345/173 |
| 2015/0317001 A1* | 11/2015 | Ben-Bassat | | G06F 3/0442 |
| | | | | 345/179 |
| 2016/0098131 A1* | 4/2016 | Ogata | | G06F 3/0446 |
| | | | | 345/173 |
| 2016/0103543 A1* | 4/2016 | Kessler | | G06F 3/0414 |
| | | | | 345/174 |
| 2016/0103544 A1* | 4/2016 | Filiz | | G06F 3/0416 |
| | | | | 345/174 |
| 2016/0139716 A1* | 5/2016 | Filiz | | G06F 3/0416 |
| | | | | 345/174 |
| 2016/0224171 A1* | 8/2016 | Kim | | G06F 3/0446 |
| 2016/0370909 A1* | 12/2016 | Wang | | G06F 3/0418 |
| 2017/0192602 A1* | 7/2017 | Kim | | G06F 3/0416 |
| 2017/0219330 A1* | 8/2017 | Sleeman | | G01D 5/2417 |
| 2017/0228070 A1* | 8/2017 | Roberts | | G06F 3/0443 |
| 2018/0157353 A1* | 6/2018 | Sleeman | | H03K 17/975 |
| 2018/0274952 A1* | 9/2018 | Sleeman | | G01D 5/2415 |
| 2018/0275811 A1* | 9/2018 | Filiz | | G06F 3/04166 |
| 2019/0258341 A1* | 8/2019 | Sleeman | | G06F 3/0447 |
| 2019/0361560 A1* | 11/2019 | Filiz | | G06F 3/0416 |
| 2019/0391689 A1* | 12/2019 | Hristov | | G06F 3/0447 |

FOREIGN PATENT DOCUMENTS

| | | |
|---|---|---|
| WO | 2004/029790 A2 | 4/2004 |
| WO | 2004/029790 A3 | 4/2004 |
| WO | 2014/124173 A1 | 8/2014 |
| WO | 2015/163842 A1 | 10/2015 |

OTHER PUBLICATIONS

British Search Report corresponding to Application No. GB 1617060.7 dated Mar. 30, 2017.

* cited by examiner

FORCE AND POSITION DETERMINATION BASED ON CAPACITIVE SENSING

BACKGROUND OF THE INVENTION

The present invention relates to the field of capacitive sensing, and in particular to multi-touch capacitance measurement and displacement sensing, for example to determine which of a plurality of sensed objects, such as a user's fingers, presses on a capacitive sensing surface causing a displacement.

Capacitive sensing techniques have become widespread for providing touch-sensitive inputs, for example in computer tablets, mobile phones, and in many other applications. Touch sensitive input devices are generally perceived to be more aesthetically pleasing than input devices that are based on mechanical switches.

Most touch sensitive input devices are capable of detecting multiple inputs, i.e., multiple touches corresponding to one or more objects—for instance, many computer touchpads use two or more finger gestures to perform certain actions. Accordingly, touch sensitive input devices and associated controllers are capable of resolving the spatial positions of multiple simultaneous touches.

There are situations in which a user may wish to rest their fingers on a sensing surface of a touch sensitive input device without actually wishing to provide input. For instance, a user may keep their fingers resting on a touch sensitive keyboard and apply additional pressure with one of their fingers when they wish to activate a key. It can therefore be desirable to determine which of a plurality of objects detected by a touch sensitive input device is applying increased pressure.

Most commercially available touch controllers can output one or more values associated with each determined touch point which provides a measure of the area or amplitude (strength) of the corresponding touch. These values display a degree of variation as pressure is modulated on the pressing object (e.g. finger), generally as a result of the object being compliant and distorting under pressure. For example, a finger tip will usually spread out to some extent in area when pushed onto a surface, which therefore affects the capacitive coupling between the finger and the touch sensor. This variation is broadly proportional (or inversely proportional depending on the specific configuration of the device) to the pressure applied.

The inventors have recognised variations in measured capacitance from changes in applied pressure are typically not in themselves sufficient for reliably distinguishing between objects simply resting on a touch sensitive input device and objects actively applying pressure, i.e., when inputting a command. For example, it is generally not possible to reliably determine the difference between a little finger pressing hard and a large finger pressing gently, and also the degree of areal spread is typically dependent upon the specific finger used, its orientation to the sensing surface, and the resilience of the finger to the pressure. For example, slender fingers generally do not spread out under load, even if applied at shallow angles, to the same extent as a less-slender finger. Equally, most fingers display relatively little areal/touch signal change when applied perpendicularly to the sensing surface.

Accordingly, in situations where multiple touches are sensed (e.g. from a plurality of fingers resting on a touch sensitive input device) it can be difficult to resolve which of the objects applies additional pressure to select an input, e.g. a selected key on a touch sensitive keyboard, based solely on data from measurements of capacitive couplings associated with the objects.

Thus, there is therefore a desire for apparatus and methods that can help to address these kinds of issue.

SUMMARY OF THE INVENTION

According to a first aspect of certain embodiments there is provided a sensing apparatus comprising: a frame; a capacitive sensor comprising a sensing surface moveably mounted relative to the frame and configured to measure, as a function of time, characteristics of capacitive couplings between the sensing surface and a plurality of objects at different locations over the sensing surface; a displacement sensor configured to detect when there is a displacement of the sensing surface relative to the frame due to a displacement load applied to the sensing surface by one of the objects; and a processing element configured to identify which of the objects applied the displacement load based on changes in the measured characteristics of the capacitive couplings for the respective objects during a time period around when the displacement of the sensing surface is detected.

According to a second aspect of certain embodiments there is provided a method of operating a sensing apparatus comprising a frame and a sensing surface moveably mounted relative to the frame to identify which of a plurality of objects at different locations over the sensing surface applies a displacement load to the sensing surface, the method comprising: measuring, as a function of time, characteristics of capacitive couplings between the sensing surface and the plurality of objects at the different locations over the sensing surface; detecting when there is a displacement of the sensing surface relative to the frame due to the displacement load applied to the sensing surface by one of the objects; and identifying which of the objects applied the displacement load based on changes in the measured characteristics of the capacitive couplings for the respective objects during a time period around when the displacement of the sensing surface is detected.

It will be appreciated that features and aspects of the invention described above in relation to the first and other aspects of the disclosure are equally applicable to, and may be combined with, embodiments of the invention according to other aspects of the invention as appropriate, and not just in the specific combinations described above. Some further aspects of certain embodiments of the disclosure are set out in the appended claims.

BRIEF DESCRIPTION OF THE DRAWINGS

The invention is now described by way of example only with reference to the following drawings in which.

DETAILED DESCRIPTION

Aspects and features of certain examples and embodiments of the present invention are discussed/described herein. Some aspects and features of certain examples and embodiments may be implemented conventionally and these are not discussed/described in detail in the interests of brevity. It will thus be appreciated that aspects and features of apparatus and methods discussed herein which are not described in detail may be implemented in accordance with any conventional techniques for implementing such aspects and features.

Figure 1:
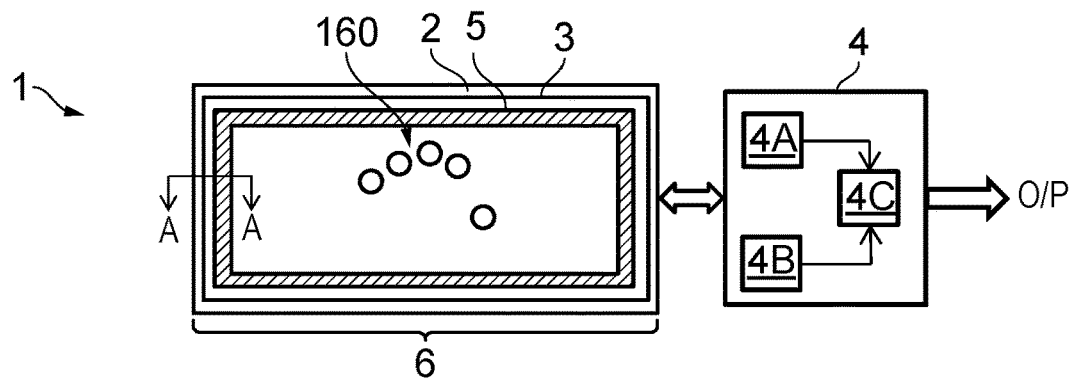
FIG. 1 schematically represents a sensor element and controller element of a sensing apparatus according to certain embodiments of the invention.
Figure 2:
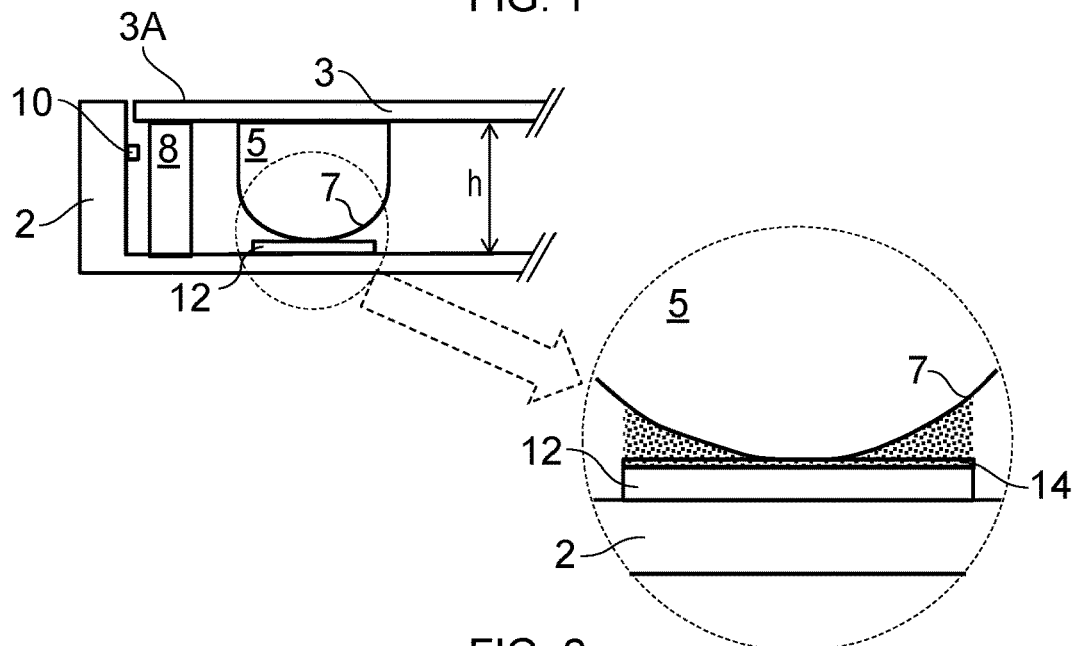
FIG. 2 schematically shows in cross-section a portion of the sensing apparatus of FIG. 1 in a non-displaced state.
Figure 3:
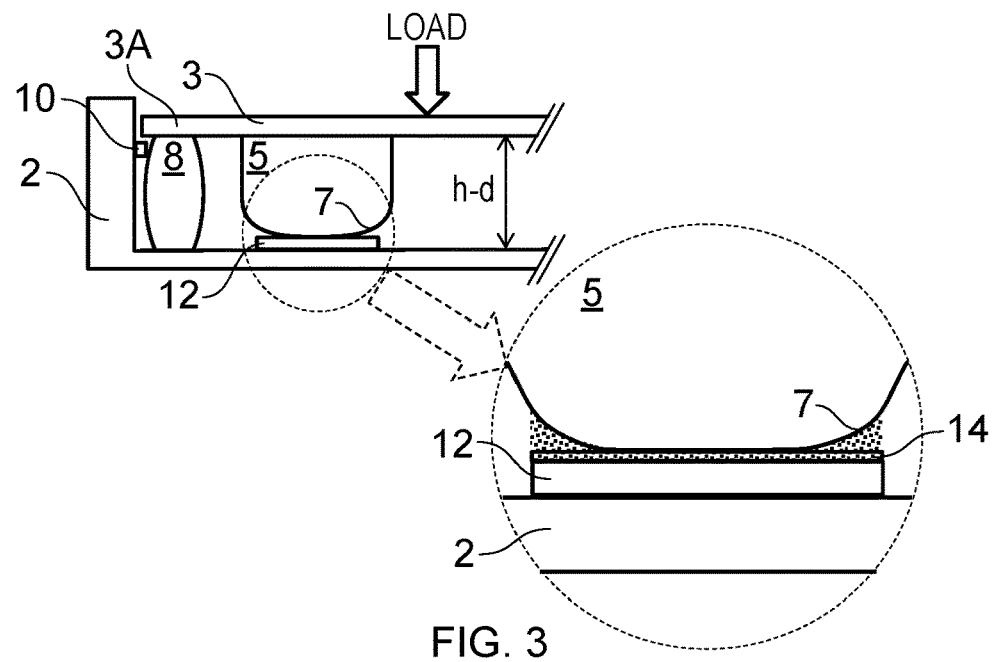
FIG. 3 schematically shows in cross-section a portion of the sensing apparatus of FIG. 1 in a displaced state.

FIGS. 1, 2 and 3 schematically represent various aspects of a sensing apparatus 1 in accordance with certain embodiments of the invention. The sensing apparatus 1 comprises two main functional parts, namely a sensor element 6 and a controller element 4. The sensor element 6 comprises a frame 2, a position sensitive capacitive sensing element 3 providing a two-dimensional sensing surface 3A that is displaceably mounted with respect to the frame 2, and a displacement sensing element, comprising electrodes 5, 12, for detecting when there is displacement of the capacitive sensing element 3 with respect to the frame. As discussed further below, the controller element 4 is configured to receive signalling from the capacitive sensing element 3 and the displacement sensing element and to identify from this which of a plurality of objects 160 detected at different locations over the sensing surface 3A of the capacitive sensing element 3 applies a displacement load. In this regard a displacement load may be considered to correspond to a load/force applied to the capacitive sensing element 3 above that provided by objects resting on the sensing surface 3A. For example, in a keyboard application, the displacement load will generally be applied to select a function or provide an input, e.g., a key press associated with the operation of an apparatus for which the sensing apparatus 1 provides a user interface.

In accordance with certain embodiments of the invention, identification of which of a plurality of objects is applying a displacement load is achieved by identifying changes in a measured characteristic of capacitive couplings between the plurality of objects and the capacitive sensing element 3 (or more particularly, the sensing surface 3A thereof) around the time a displacement of the sensing surface is detected, e.g. within a time period determined based on a detected displacement of the capacitive sensing element 3. When the displacement of the capacitive sensing element 3 is sufficient (e.g. above a predefined threshold considered to correspond to a press), the controller element 4 identifies which object has applied the load to cause the displacement based on observed changes in a capacitive coupling characteristic for each of the detected objects around the time of the displacement, for example by determining which object is associated with the greatest change in a characteristic associated with its capacitive coupling to the sensing surface, or a greatest rate of change in a characteristic associated with its capacitive coupling to the sensing surface, around the time a displacement is detected. The capacitive coupling characteristic may, for example, be a measure of a magnitude of capacitive coupling, a measure of an areal extent of capacitive coupling, or a measure of a position for the capacitive coupling.

Thus the sensing apparatus of FIG. 1 includes a displacement sensing function for detecting a displacement of the capacitive sensing element 3 and a capacitive coupling sensing function for sensing the capacitive coupling of objects adjacent the capacitive sensing element 3. The displacement sensing function is provided by the displacement sensing element and associated displacement sensing element measuring circuitry 4B in the controller element 4. Together the displacement sensing element and displacement sensing element measuring circuitry 4B can be considered as a displacement sensor. The capacitive coupling sensing function is provided by the capacitive sensing element 3 and associated capacitive sensing element measuring circuitry 4A in the controller element 4. Together the capacitive sensing element 3 and capacitive sensing element measuring circuitry 4A can be considered as a capacitive sensor. Measurements of displacements by the displacement sensing element measuring circuitry 4B and measurements of changes in capacitive coupling characteristics for objects adjacent the capacitive sensing element 3 are processed by the processing circuitry 4C in the controller element 4 to determine which object applied a displacement load in accordance with the principles described herein.

FIG. 1 schematically represents the sensor element 6 in plan view and the controller element 4 in highly schematic form (i.e. as a functional block). FIGS. 2 and 3 respectively show portions of the sensor element 6 of the sensing apparatus 1 in cross-section (taken on the line A-A represented in FIG. 1), with FIG. 2 showing the sensing apparatus 1 in a non-displaced (rest) state and FIG. 3 shows the sensing apparatus 1 in a displaced state.

The sensing apparatus 1 is arranged to measure a displacement of the capacitive sensing element 3 relative to the frame 2, for example in response to a user pressing on or applying a displacement load to the capacitive sensing element 3. In this example embodiment, the displacement sensor function is based on measuring changes in capacitive coupling associated with a deformable electrode 5 arranged between the capacitive sensing element 3 and frame 2 and a reference electrode 12. This capacitive coupling is measured by the displacement sensing element measuring circuitry 4B, for example using conventional capacitive measurement techniques. Displacement of the sensing surface 3A relative to the frame 2 causes a change in the capacitive coupling between the deformable electrode 5 and the reference electrode 12 as the deformable electrode 5 deforms under the displacement load. It will be appreciated the use of capacitive sensing technologies to detect displacement may be convenient in certain implementations in that similar controller technologies can be used for sensing displacement and for sensing the presence and positions of objects adjacent the sensing surface 3A. Also, a capacitive-based displacement sensing approach can be configured to provide an indication of a degree of displacement, as opposed to a simple binary detection. This can be useful in some cases, for example, to allow changes in a desired threshold for establishing when a displacement is deemed to have occurred. For example, the sensitivity to detect displacement may be adjusted by simply changing the threshold at which a displacement is considered to have occurred. Thus, if it is desired that a relatively light touch should be recognised as a displacement, a relatively low threshold can be set, whereas if it is desired that a relatively heavy touch is needed to be considered a displacement, a relatively high threshold could be set. However, it will be appreciated the specific displacement sensing technology is not significant in the principles described herein and in other implementations other types of displacement sensing technology may be used. For example, in some implementations the sensing surface 3A may be configured to press against a mechanical switch when displaced to provide a simple binary indication of when the sensing surface 3A has been displaced. In general, any sensing technology that is able to provide an indication of when a physical displacement of the sensing surface 3A occurs may be adopted.

The sensing surface 3A of the capacitive sensing element 3 is the side of the capacitive sensing element 3 to which a load is applied during normal use. The application of an example load during use, e.g. corresponding to a user pressing a finger on the capacitive sensing element 3, is schematically shown in FIG. 3 by the arrow labelled "LOAD". For ease of explanation, the side of the sensing apparatus 1 to which the load is applied in normal use may sometimes be referred to herein as the "upper" or "outer" side of the sensing apparatus 1 (or similar terminology such as "top"), with the other side being referred to as "lower" or "inner" (or similar terminology, such as "bottom"). Thus, the sensing surface 3A of the capacitive sensing element 3 shown uppermost in the orientation of FIGS. 2 and 3 may sometimes be referred to as the upper/outer/top surface of the capacitive sensing element 3. Likewise, the lowermost surface of the capacitive sensing element 3 for the orientation of FIGS. 2 and 3 may sometimes be referred to as the bottom/lower/inner surface. Corresponding terms may similarly be used in respect of other parts of the sensing apparatus 1 in accordance with the orientation shown in the relevant figures. However, it will be appreciated this terminology is used purely for convenience of explanation and is not intended to suggest a particular orientation of the sensing apparatus 1 should be adopted in normal use. For example, although in the orientation of FIGS. 2 and 3 the upper surface of the sensor element 6 is shown uppermost, the sensor element 6 could equally be used in a downward facing configuration, or facing outwards from a vertical surface, according to the implementation at hand. More generally, the sensing apparatus 1 may be incorporated in a portable device (such as a tablet computer or mobile telephone), and in that case the orientation in use will vary according to how a user happens to be holding the device.

The frame 2 provides a structural support for the capacitive sensing element 3 and will typically be connected to, or comprise an integral part of, an apparatus in which the sensing apparatus 1 is provided. The frame 2 may comprise any suitable structural material, for example it may be formed from metal or plastic. The frame 2 in this example defines a recess/opening into which the capacitive sensing element 3 is received and moveably supported therein by a support element 8 arranged around a peripheral part of the capacitive sensing element 3. In this example the movable mounting of the capacitive sensing element 3 relative to the frame 2 is provided by virtue of the support element 8 comprising a resiliently compressible material. An upper edge of the support element 8 is bonded to the underside of the capacitive sensing element 3 and a lower edge of the support element 8 is bonded to the frame 2. Conventional bonding techniques can be used for bonding the support element 8 to the other parts of the sensing apparatus 1, for example having regard to bonding techniques appropriate for the materials involved.

The support element 8 in this example is thus generally in the form of a rectangular ring arranged around a peripheral part of the capacitive sensing element 3. The support element 8 has a generally rectangular cross-section when in its relaxed state (as shown in FIG. 2), although when the support element 8 is compressed by virtue of a load being applied to the capacitive sensing element 3, its sides may bow out to accommodate the movement, as schematically indicated in FIG. 3. It will, however, be appreciated that other shapes could be used in accordance with established mounting practices. For example, more complex shapes for the support element 8 may be chosen to provide different degrees of compressibility according to the degree to which the support element is already compressed. The capacitive sensing element 3 may be provided with a stop 10 to limit the extent to which the support element 8 may be compressed (i.e. to limit the extent to which the capacitive sensing element may be displaced relative to the frame element 2). In this example such a stop is provided by a suitably arranged protrusion 10 from a side wall of the recess defined by the frame element 2. This protrusion may extend all around the recess or may be provided at a number of discrete locations around the recess.

The support element 8 in this example comprises an elastomeric material having an appropriate degree of rigidity and compressibility according to the application at hand (i.e. providing a desired level of resistance to compression). In some cases there may be a desire for a material having relatively low compressibility, thereby requiring a relatively high load to generate a given displacement of the capacitive sensing element 3 relative to the frame element 2. Conversely, in some cases there may be a desire for a material having relatively high compressibility, thereby requiring a relatively low load to generate a given displacement of the capacitive sensing element 3 relative to the frame element 2. This will be a question of design choice. For example, in the context of displacement sensor forming a user interface a designer may choose how hard the user must press to cause a given displacement. This may be done, for example, to balance the risk of accidental activation against requiring too great a force for activation. A material having the desired degree of compressibility may be selected from modelling or empirical testing, for example.

With reference to FIGS. 2 and 3, the deformable electrode 5 is arranged between the capacitive sensing element 3 and the frame 2 and follows a generally rectangular path around (i.e. within and adjacent to) a peripheral region of the capacitive sensing element 3. The deformable electrode 5 has a generally "D" shaped cross-section with a lower curved wall 7, which may also be referred to as a contact surface 7 for the deformable electrode 5. The specific geometry of the deformable electrode 5, e.g. in terms of its cross-sectional size, separation from the peripheral edge of the capacitive sensing element 3, and the extent to which it extends around the whole periphery, is not significant to the principles described herein and may vary depending on the specific construction of the sensing apparatus 1.

The deformable electrode 5 may be formed in a number of different ways. In this example the deformable electrode 5 comprises a suitably profiled elastomeric conductive foam; however, other materials may also be used. An electrical connection to the deformable electrode 5 to allow for the measurements discussed further below may be made using one or more conductors in contact with the deformable electrode 5.

Between the deformable electrode 5 and the frame 2 is the reference electrode 12. The reference electrode 12 is generally in alignment with the deformable electrode 5 and follows a corresponding path beneath the deformable electrode 5. An upper surface of the reference electrode 12 is provided with an electrical insulator layer 14 (shown schematically in the magnified parts of FIGS. 2 and 3). The insulator layer 14 prevents the overlying deformable electrode 5 from coming into direct electrical contact with the reference electrode 12 when the deformable electrode 12 is pressed against the reference electrode 12 during displacement of the capacitive sensing element 3 towards the frame 2.

The reference electrode 12 may be provided in a number of different ways, for example as a conductive trace deposited on the frame 2. The insulator layer 14 may also be provided in a conventional manner, for example comprising a plastic film or layer of plastic/resin encapsulant over the reference electrode 12. It will, however, be appreciated that different techniques can be used in different implementations. Although the reference electrode 12 is schematically represented in FIGS. 2 and 3 as being disposed on top of the frame 2, in other examples the reference electrode may be embedded within the frame 2. If the frame 2 is conductive, the reference electrode 12 may be insulated therefrom. It will be appreciated the reference electrode 12 and insulator layer 14 might typically be relatively thin compared to the other elements of the sensor element 6 shown in FIGS. 2 and 3, but these figures are not drawn to scale with the reference electrode 12 (and its layer of insulation 14) shown with exaggerated thickness in the cross-sections of FIGS. 2 and 3 for ease of representation.

As noted above, FIG. 2 schematically represents the sensor element 6 in a rest state with no displacement load applied to the capacitive sensing element 3. In this example the gap between the upper surface of the frame element 2 and a lower surface of the capacitive sensing element 3 is, as indicated in FIG. 2, h. This gap h corresponds with the height of the support element 8 in its relaxed state. In this example the support element 8 is sized to provide a gap h that is slightly less than the height of the deformable electrode 5, such that the deformable electrode 5 is in slight compression so there is a portion of its contact surface 7 for which there is no free space (air gap) between the deformable electrode 5 and the frame element 2, even when in the rest (non-displaced) state.

FIG. 3 schematically represents the sensor element 6 in a displaced state in which a displacement load is applied to the capacitive sensing element 3. The displacement load may, for example, be provided by a user's finger pressing on the outer surface of the capacitive sensing element 3. The support element 8 and the deformable electrode 5 are both compressed under the action of the displacement load allowing the capacitive sensing element 3 to move along a displacement direction towards the frame element 2 by an amount d. The magnitude of the displacement d will be a function of the force (load) applied and the combined resilience of the support element 8 and the deformable electrode 5. The capacitive sensing element 3 in FIG. 3 is schematically shown as remaining parallel to the frame when displaced, but in general it may be expected the displacement element 3 may be tilted depending on the location of the load (i.e. the value of d may be different at different positions across the displacement element 3). In this example the magnitude of the displacement is assumed to be around 0.1 cm.

As a consequence of the deformable electrode 5 being squashed under the displacement load, the curved contact surface 7 is pressed harder against the underlying insulator layer 14. This causes the contact surface 7 to flatten against the insulator layer 14, thereby reducing the overall volume between the deformable electrode 5 and the reference electrode 12 as compared to the rest state represented in FIG. 2. The space between the deformable electrode 5 and the reference electrode 12 is schematically shown with shading in FIGS. 2 and 3, and it can be seen how the shading in FIG. 3 occupies a smaller area than the shading in FIG. 2.

Because the volume of the space between the deformable electrode 5 and the reference electrode 12 is reduced under the displacement load, the capacitive coupling between the deformable electrode 5 and the reference electrode 12 increases when the displacement load is applied. The controller element 4, and in particular the displacement sensing element measuring circuitry 4B, is configured to measure a characteristic of the capacitive coupling associated the two electrodes, thereby allowing a determination as to whether a displacement has occurred to be made. Connections between the displacement measuring circuitry 4B and the respective electrodes can be established in accordance with conventional techniques, for example using appropriate wiring. There are various different ways in which a characteristic of the capacitive coupling between the two electrodes can be measured. For example, the mutual capacitive coupling between the two electrodes could be measured by applying a drive signal to one of the electrodes and measuring the extent to which the drive signal is coupled to the other of the electrodes. Alternatively, the self-capacitance of one of the electrodes could be measured with respect to a reference potential whilst the other electrode is connected to the reference potential (e.g. a system ground or other system reference potential). For simplicity the system reference potential may sometimes be referred to herein as a system ground or earth, but it will be appreciated the actual potential itself may be arbitrary and is not significant (e.g. it could be 0V, 5V or 12V, or any other value according to the implementation at hand). In yet another example, one of the electrodes may comprise two components which are capacitively coupled to one another. For example the reference electrode 12 of FIGS. 1 to 3 may be replaced with a reference electrode comprising a pair of parallel or interdigitated conductors which are insulated from one another but in a relatively close proximity on the frame 2, with the gap between them underlying the deformable electrode 5. The mutual capacitive coupling between the two conductors comprising the reference electrode could be measured by applying a drive signal to one of the conductors and measuring the extent to which the drive signal is coupled to the other of the conductors. The component of the drive signal coupled between the electrodes will generally be reduced as the overlying deformable electrode is compressed on to them under the displacement load. Nonetheless, it will be appreciated the specific capacitive sensing technology used to detect changes in the capacitive coupling between the deformable electrode 5 and the reference electrode 12 is not significant to the principles described herein. Rather what is significant is that the sensing apparatus 1 is able to detect when a displacement has occurred, and this may be detected using any known displacement sensing technology.

Turning now to the capacitive coupling/sensing function, the capacitive sensing element 3 is configured to sense capacitive couplings between the one or more objects 160 disposed on the sensing surface 3A of the capacitive sensing element 3. The capacitive sensing element 3 may be based on any known design, and may be constructed from a single layer or multiple, stacked layers, e.g., a capacitive sensor layer and a protective cover layer. In any case, the uppermost surface (i.e., the surface furthest from the frame 2 in FIGS. 2 and 3) may be considered to provide the sensing surface 3A adjacent which objects are detected. In FIG. 1, the plurality of objects 160 are schematically depicted as circles on the sensing surface 3A, the circles in this example are representative of the positions of four finger tips and a thumb of a user's hand. Of course, it should be appreciated that the number of objects 160 is not limited to five as shown and may be more, for example ten in a case a user is using both hands, or fewer, for example in a case a user only using two or three of their digits.

The capacitive sensing element 3 includes a number of conductive electrodes or traces positioned through, or on a surface of, the capacitive sensing element 3. These electrodes are electrically connected to the capacitive sensing element measuring circuitry 4A in the controller element 4, which is configured to measure capacitor couplings associated with the spatial electrodes and determine the positions of objects against the capacitive sensing element 3. As will be appreciated there are many well-established techniques for capacitively sensing the positions of multiple objects over a two-dimensional sensing surface, and any of these technologies may be adopted for the capacitive coupling/capacitive position sensing function of the sensor element 6. In this regard, the specific pattern of electrodes/traces provided across the sensing surface and the associated capacitance measurement techniques provided by the capacitive sensing element measuring circuitry 4A will depend on the specific sensing technology adopted. As is conventional, the electrodes/traces may be made from any suitable conductive material, such as copper or transparent indium tin oxide (ITO) deposited on a substrate. In one example, the electrodes are arranged in a grid with overlapping horizontal (X) and vertical (Y) electrodes in a well-established configuration for capacitive sensing.

In essence, signalling associated with the capacitive sensing element 3 provides an indication of a degree of capacitive coupling between objects overlying the sensing surface and the electrodes comprising the sensing surface. The specific nature of the signalling and the manner in which it indicates a degree of capacitive coupling will depend on the sensing technology adopted. The textbook "Capacitive Sensors: Design and Applications" by Larry K. Baxter, August 1996, Wiley-IEEE Press, ISBN: 978-0-7803-5351-0 [1] summarises some of the principles of conventional capacitive sensing techniques that may be used for measuring capacitance characteristics in accordance with various implementations. More generally, and as already noted, any established techniques for measuring indications of degrees of capacitive couplings between objects and a sensing surface and positions of the objects within the sensing surface could be adopted.

One example technique for measuring a degree of capacitive coupling uses so-called mutual capacitance measurement techniques. Mutual capacitance can be measured by applying a time varying drive signal to one electrode (e.g., a horizontal electrode) and measuring the extent to which the drive signal is capacitively coupled to another electrode (e.g., a vertical electrode) using conventional capacitance measurement techniques. The magnitude of the mutual capacitive coupling between the electrodes is influenced by the presence of nearby objects, e.g., human fingers. Changes in mutual capacitance measurements may therefore be considered to represent changes in capacitive couplings between nearby objects and the sensing surface.

Another example technique for measuring a degree of capacitive coupling uses so-called self-capacitance measurement techniques. Self-capacitance can be measured by determining the capacitance of an array of electrodes with respect to a reference potential. For example, the self-capacitance of a rectangular array of electrodes can be individually monitored. Changes in the measured self-capacitance for a particular electrode can be considered to represent a change in capacitive coupling between an object adjacent that particular electrode.

It should be understood that the above discussion sets out only some example ways in which capacitive sensing may be implemented for the capacitive sensing element 3 and it will be appreciated various other established techniques, or combination of established techniques, may be used for different implementations.

The capacitive sensing element 3 in this example is in the form of a planar rectangle, but other shapes may be used. The size of the capacitive sensing element 3 may be chosen according to the implementation at hand to provide the desired area over which a displacement load/force is to be detected. Purely for the sake of a specific example, it will be assumed here the capacitive sensing element 3 has a size of around 30 cm (width)×15 cm (height)×0.3 cm (thickness). The capacitive sensing element 3 in this example is formed generally of a non-conductive material, for example a glass or plastic material, but includes the conductive electrodes/traces. The capacitive sensing element 3 may be transparent or opaque according to the application at hand. For example, in some implementations a display screen may be provided below the sensor element 6. In this case the capacitive sensing element 3 (and any parts of the frame 2 overlying the display screen) should be transparent, at least to some extent, to allow a user to see the display screen through the sensor element 6. In other cases there may be a desire from a design perspective to hide what is behind the capacitive sensing element 3 (for example because there is internal wiring or structural elements of an apparatus in which the sensor element 6 is mounted which are not intended to be visible to the user for aesthetic reasons). In this case the capacitive sensing element 3 and/or frame 2 may be opaque. In such cases, the sensing surface 3A may include markings or other form of indicia representing certain functions associated with the device in which the sensing apparatus 1 is to be used, e.g., the letters of the alphabet at positions on the capacitive sensing element 3 corresponding to a conventional keyboard' layout.

As noted above, the sensing apparatus 1 also comprises the controller element 4. In FIG. 1, the controller element 4 is schematically shown as comprising the capacitive sensing element measuring circuitry 4A, the displacement sensing element measuring circuitry 4B, and the processing circuitry 4C. The controller element 4 thus comprises circuitry which is suitably configured/programmed to provide the functionality described herein using conventional programming/ configuration techniques for capacitive sensors. While the capacitive sensing element measuring circuitry 4A, displacement sensing element measuring circuitry 4B, and processing circuitry 4C are schematically shown in FIG. 1 as separate elements for ease of representation, it will be appreciated that the functionality of these components can be provided in various different ways, for example using a single suitably programmed general purpose computer, or field programmable gate array, or suitably configured application-specific integrated circuit(s)/circuitry or using a plurality of discrete circuitry/processing elements for providing different elements of the desired functionality.

In accordance with conventional techniques, the capacitive sensing element measuring circuitry 4A is configured to receive signalling from the capacitive sensing element 3 and to perform processing thereon to establish the positions of objects adjacent the sensing surface 3A of the capacitive sensing element 3. The specific processing will depend on the specific arrangement of the conductive electrodes/traces of the capacitive sensing element 3. Depending upon the resolution of the capacitive sensing element 3, there may be multiple detection nodes for each detected object (i.e., multiple measurements of capacitive coupling at different position). The capacitive sensing element measuring circuitry 4A may be configured to interpolate measurements for each sensing node position to provide a single position estimate for the object.

In addition to determining position estimates for objects adjacent the sensing surface, the capacitive sensing element measuring circuitry 4A in this example is also configured to determine an indication of the magnitude of capacitive coupling(s) associated with the respective objects, i.e. what might be referred to as the strength or amplitude of the capacitive coupling.

Thus, the apparatus represented in FIGS. 1 to 3 is operable to determine both the characteristics of capacitive coupling between different objects and the capacitive sensing element 3 and also a displacement of the capacitive sensing element 3 relative to the frame, for example due to a user pressing on the capacitive sensing element 3. These measurements may be used, in accordance with the principles described herein, to establish which of a plurality of objects applies a displacement load to the capacitive sensing surface.

An example application of the apparatus represented in FIGS. 1 to 3 will now be described. To do this it will be assumed a user has three fingers resting on the capacitive sensing surface 3A, and uses one of these fingers to apply a force to displace the sensing surface 3A. This may be in order to select a particular input button associated with that position on the sensing surface 3A, for example. However, it will be appreciated the specific reason for a user wishing to provide any particular user input is not significant to the principles described herein.

Figure 4A:
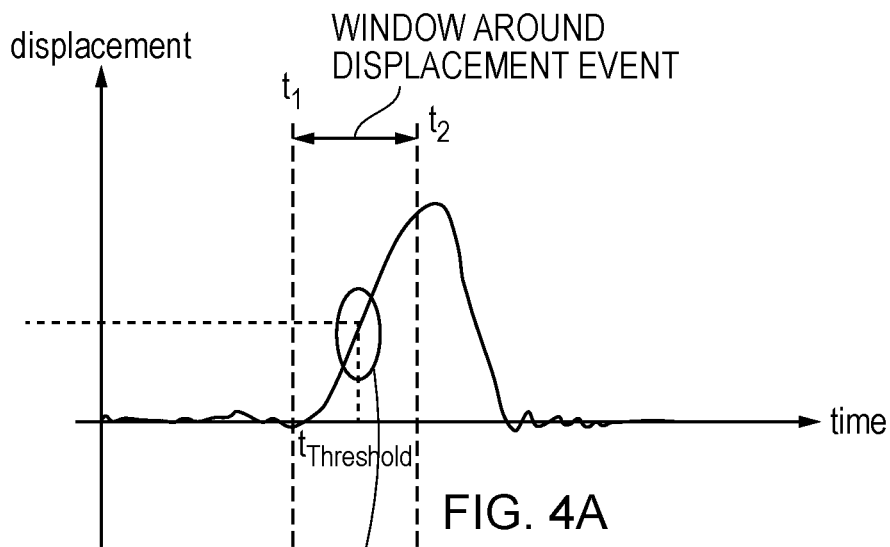
FIG. 4A is a graph of exemplary displacement data measured by the displacement sensor of the sensing apparatus of FIGS. 1, 2 and 3 as a function of time when one of a plurality of objects presses on and displaces the sensing surface.

FIG. 4A schematically represents the measured displacement of the capacitive sensing element 3 as a function of time (i.e. displacement data) during a period in which the capacitive sensing element 3 undergoes a displacement. Time extends across the horizontal axis and the measured displacement determined by the displacement sensing element measuring circuitry is recorded on the vertical axis in arbitrary units. As can be seen the displacement starts to occur at time $t_1$, and the user stops pressing at time $t_2$, after which the displacement returns to 0.

Figure 4B:
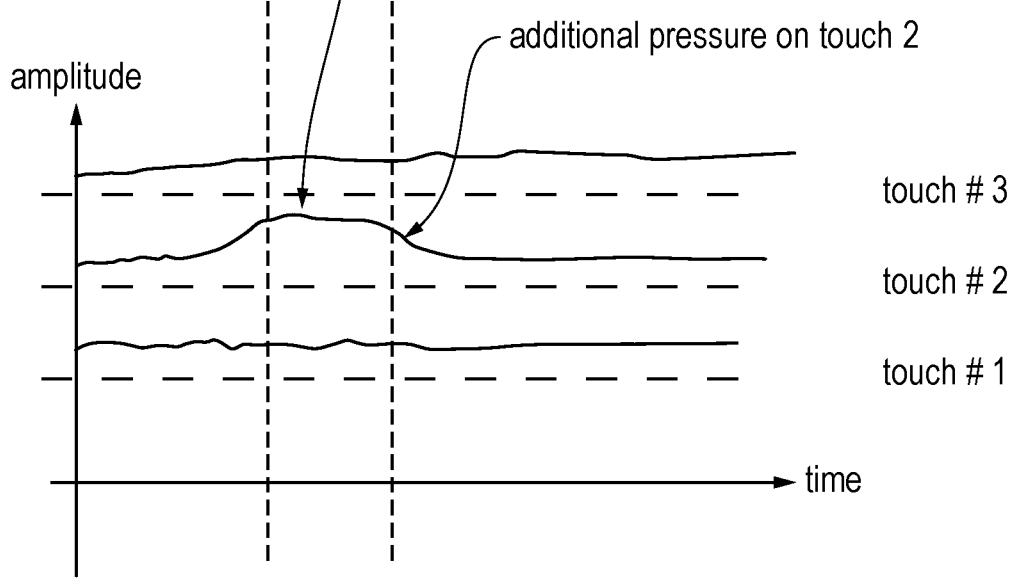
FIG. 4B is a graph of exemplary capacitive coupling data representing a degree of capacitive coupling between respective ones of a plurality of objects over the sensing surface measured by the capacitive sensing element of the sensing apparatus of FIGS. 1, 2 and 3 during the same time period as represented in FIG. 4A.

FIG. 4B schematically represents the output from the capacitive sensing element measuring circuitry 4A (i.e. amplitude data) as a function of time during the same period as represented in FIG. 4A (i.e. when a user applies a displacement load to the sensing surface 3A with one of their fingers). There are three traces shown in FIG. 4B showing the degree of capacitive coupling (amplitude/strength) associated with each of the three objects (touches) detected by the capacitive sensing element measuring circuitry 4A as a function of time. Time extends across the horizontal axis and the measured degree of capacitive coupling for each object is recorded on the vertical axis in arbitrary units and with respectively offset horizontal axes indicated by dotted lines.

The displacement sensing element measuring circuitry 4B is configured to output an indication that the capacitive sensing element 3 has been displaced (or is currently displaced) to the processing circuitry 4C. In one example, the displacement sensing element measuring circuitry 4B in effect provides a binary indication as to whether or not there has been a displacement greater than a displacement threshold. For example, the displacement sensing element measuring circuitry 4B may be configured to identify when there has been a change in measured capacitance from the displacement sensor element that is greater than a pre-defined capacitance change threshold, and to determine that this corresponds with a displacement by more than an amount corresponding to the threshold displacement. An appropriate value for the pre-defined capacitance change threshold in any given implementation can be established empirically having regard to the extent of displacement which is desired to trigger a determination that an intended displacement has occurred, and may be dynamically chosen to suit a given application. In terms of a dynamic threshold, typically a user will place or rest one or more objects 160 on the sensing surface 3A of the capacitive sensing element 3. Therefore, resting objects 160 may cause the capacitive sensing element 3 to be displaced slightly from its at rest state (FIG. 2) but not sufficiently displaced to cause the displacement sensing element measuring circuitry 4B to determine the capacitive sensing element 3 surpasses the displacement threshold corresponding to an intended press. If the displacement threshold/trigger is not changed in this case, an additional force exerted by any one object would reach/ surpass the fixed displacement threshold more readily compared to when there is no initial displacement of the capacitive sensing element 3. The use of a dynamic threshold (e.g. set relative to a moving average displacement measure) may take an initial displacement of the capacitive sensing element 3 into account and so be set in such a way that a certain fixed amount of force/displacement is required to cause the capacitive sensing element 3 to surpass the dynamic displacement threshold regardless of the initial displacement. This may overcome sensitivity issues when using a fixed displacement threshold, for example, which after the initial displacement may only require a small force for the capacitive sensing element 3 to surpass the displacement threshold. Additionally or alternatively, the dynamic threshold may be set taking into account the number of objects sensed on the sensing surface 3A: for example, the greater the number of sensed objects, the higher the dynamic threshold is set.

The indication output by the displacement sensing element measuring circuitry 4B can take a number of different forms depending upon the specific configuration of the controller element 4. In one example, the indication is a binary signal, e.g. going from low to high to indicate when the capacitive sensing element 3 is determined to be displaced by an amount that surpasses the displacement threshold. The binary signal may remain high for so long as the measured displacement remains above the threshold, or may be pulsed to indicate when the measured displacement crosses the threshold.

The processing circuitry 4C of the controller element 4 is configured to identify which of one or more objects detected by the sensing surface 3A applied the detected displacement load to the capacitive sensing element 3 based on the data from the capacitive sensing element measuring circuitry 4A around the time the displacement sensing element measuring circuitry 4B detects a displacement has occurred.

The processing circuitry 4C receives the spatial position data (X, Y coordinate) corresponding to each of the sensed objects 160 and amplitude data (indicating the amount of capacitive coupling) for each object from the capacitive sensing element measuring circuitry 4A, and the indication that the displacement threshold has been surpassed from the displacement sensing element measuring circuitry 4B. The processing circuitry 4C is configured to process this data to determine which of the plurality of objects applied the load responsible for displacing the capacitive sensing element 3 beyond the displacement threshold. Several algorithms may be employed in accordance with the principles of the present disclosure as discussed herein.

In one example the controller element 4, or more particularly, the processing circuitry 4C determines a displacement time period/time window from the indication output by the displacement sensing element measuring circuitry 4B. The time window defines a start and end time. In FIG. 4A, the indication of measured displacement first surpasses the displacement threshold (schematically represented by a dashed line in FIG. 4A) at a time $t_{Threshold}$. Based upon $t_{Threshold}$, the processing circuitry 4C calculates a time window or period defined by times $t_1$ and $t_2$. In this example, the time window is calculated by adding and subtracting a quantity, $\Delta t$, to $t_{Threshold}$. In other words, a lower time limit is given by time $t_1$ (which is equivalent to $t_{Threshold}-\Delta t$) and an upper time limit given by time $t_2$ (which is equivalent to $t_{Threshold}+\Delta t$). The quantity $\Delta t$ can be a predetermined quantity (e.g., 1 ms) set in advance based upon the parameters of the sensing apparatus 1, such as the responsiveness to the application of a displacement load or a processing/signal delay time. Appropriate values for $\Delta t$ for a given application may be chosen empirically.

In another example, the upper limit of the time window $t_2$ may be set to equal $t_{Threshold}$ and the lower limit set equal to $t_1$ or, alternatively, the lower limit of the time window $t_1$ may be set to equal $t_{Threshold}$ and the upper limit equal to $t_2$. The choice of how the time window is set relative to $t_{Threshold}$ may also be dependent upon the displacement sensor's responsiveness and/or processing delays. For instance, there may be situations that require the amplitude data to change or start to change before or at the same time as the displacement data changes, or the inverse, to change or start to change just after the displacement data changes.

Once the time window has been established by the processing circuitry 4C, the processing circuitry 4C searches the time series amplitude data received by the capacitive sensing element measuring circuitry 4A for each of the objects 160 within the time window. In other words, the processing circuitry 4C searches and compares the amplitude data for each object 160 between times $t_1$ and $t_2$.

In one example embodiment, the amplitude data relating to each of the objects 160 is assessed to determine the amplitude data for the object having the strongest/greatest change in the amplitude data within the time window. In one implementation, the strongest/greatest change in the amplitude data is determined based on the maximum amplitude value (i.e., peak value) for the amplitude data for each object. The amplitude data for one object displaying the strongest/greatest change within the time window is determined to be the object responsible for applying the displacement load to the capacitive sensing element 3. In FIG. 4B, the amplitude data corresponding to touch #2 shows a rise in the (magnitude of the) amplitude data within the time window, and thus in this example the processing circuitry 4C determines that the object corresponding to touch #2 is the most probable object from the plurality of sensed objects that is pressing on the sensing surface to cause the determined displacement.

In another implementation, the processing circuitry 4C is configured to determine the strongest/greatest change in the amplitude data based on historical values calculated for each of the amplitude data prior to the determined time window. For example, with reference to FIG. 4B, the base level of the amplitude data prior to $t_1$ is some distance above the zero amplitude line for each of the touches (as indicated by each of the respective dashed horizontal lines). This is because one or more objects 160 resting on the sensing surface 3A will likely have a non-zero capacitive coupling to the electrodes of the capacitive sensing element 3. However, the loads applied by the resting objects may not be sufficient to cause the displacement of the capacitive sensing element 3 beyond the displacement threshold.

Because different fingers may influence the capacitive couplings of the capacitive sensing element 3 differently (i.e., an index finger has a larger area than a little finger), the greatest change in this implementation is determined based on a change in the amplitude data for each object 160 determined with respect to historical amplitude data prior to the defined time window for the respective objects. For example, an average historical value may be calculated for each object 160 based on the average value of amplitude data in a time period of, e.g., 1 second before the beginning of the time window (i.e., before $t_1$). Other time periods may be used and may additionally include a delay (where amplitude values are not considered) between the end of the time period used for the average historical value and the beginning of the time window. The average historical value may be continually updated based on amplitude data received at regular intervals from the capacitive sensing element 3.

In a variation on using historical data, the processing circuitry 4C is configured to compare, for each object/touch, the value of the amplitude data at the start of the time window (i.e., at $t_1$) with a value of the amplitude data within the window. For example, the value of the amplitude data may be taken at the point in time at which the amplitude value is largest for each of the touches. In this case, the point in time within the window may vary for each of the touch points, e.g., the point in time is different for touch #1 as opposed to touch #2 and touch #3. Alternatively, the value of the amplitude data may be taken at the time at which a maximum amplitude value between all touch points occurs with this time used by the processing circuitry 4C for all the touch points.

The processing circuitry 4C calculates a ratio between the value of the amplitude data at a certain point in time in the time window and the value of the amplitude data at the start of the time window. With reference to FIG. 4B, assuming $t_{Threshold}$ is chosen as the point in time within the window, the ratios for touch #1 and touch #3 will be approximately one because the amplitude is approximately constant in this period. However, with touch #2, the ratio will be larger than 1.

Based upon these ratios, the total displacement can then be apportioned to each object/touch. For example, using FIG. 4B, the total measured displacement can be apportioned to each of touch #1 to touch #3. Because the ratio of amplitude values for touch #1 and touch #3 are relatively small, the apportioned amount of the displacement is also relatively small. In contrast, because the ratio for touch #2 is relatively large, then a relatively large proportion of the displacement is assigned to touch #2—FIG. 4B this will be approximately 100%. In this way, the approximate "pressure" contribution from each of the sensed touches can be computed by the processing circuitry 4C meaning that, not only is X, Y position data available for each of the sensed objects but that each object can be assigned a pressure attribute. The processing circuitry 4C is configured to determine the most appropriate object that applies the displacement load based upon a comparison of the pressure attributes (which is in turn based upon the amplitude data). With FIG. 4B, touch #2 has the greatest pressure attribute and so is selected as the most probable/likely object applying the displacement load.

In another implementation, the greatest change may be determined based on a mean average value of the amplitude data within the time window. That is, amplitude data for each object is sampled between $t_1$ and $t_2$ at a certain frequency and an average of all the sample values is performed for each object. The object corresponding to the amplitude data having the greatest average value as compared to the plurality of objects is determined by the processing circuitry 4C to be the most probable object applying the displacement load. In other implementations, the output from the capacitive sensing element 3 may be a continually varying waveform, e.g., a time-varying voltage. In this case, instead of the mean average, a root mean square (RMS) value during the time window for each object's amplitude data can be determined. The object corresponding to the amplitude data having the greatest RMS value is determined to be the most probable object applying the displacement load.

Regardless of the specific way in which the greatest change is determined, the processing circuitry 4C outputs the most probable/likely object from the plurality of detected objects 160 applying the additional load to the sensing surface 3A, as indicated in FIG. 1 by the arrow labelled O/P. More specifically, the processing circuitry 4C outputs the X, Y position coordinates of the most likely object applying the displacement load.

In this manner, the device to which the sensing apparatus 1 is integrated or used with can function in a conventional way. That is, a computer program or application running on the device can select an operation or function based on a comparison of the X, Y position data for the most likely object with X, Y position data ranges (or gesture position ranges) corresponding to the operation/function. In the case of a touch sensitive keyboard, for example, the X, Y position data for the most likely object may fall within the X, Y position data ranges for selecting the letter "a" as an input. Therefore, even though there may be several other objects resting on the sensing surface 3A (at positions corresponding to other letters), the processing circuitry 4C identifies the X, Y position for the letter "a" as the most probable object applying the displacement load (and thus the most probable user input) and this is the function that is ultimately selected.

In this way, the controller element 4 is able to distinguish which one of a plurality of objects applies a displacement load to the sensing surface 3A of the capacitive sensing element 3 by comparing amplitude data around the time period at which displacement of the capacitive sensing element 3 is detected and associating a change in the amplitude data for one object 160 with the displacement detected by the displacement sensor.

It will be appreciated there are various modifications that can be applied to the above-described approaches.

For example, although in some examples the processing circuitry 4C may determine which one of the plurality of objects applies the displacement load based upon the greatest/strongest change in the corresponding amplitude data, to determine which of the objects applies the displacement load in other embodiments, the processing circuitry 4C may determine which amplitude data and corresponding touch point displays a change in the amplitude data that is nearest/closest in time to the change in the displacement data. In other words, the processing circuitry 4C is configured to identify a point in time in the displacement data corresponding to when displacement of the capacitive sensing element 3 is detected—for example, the point in time may be when the displacement data surpasses the displacement threshold, $t_{Threshold}$. Within the time window, the amplitude data is searched as before but any changes that are identified are assigned a time value, $t_{event}$ (i.e. a time at which there is a change in measured capacitive coupling for an object greater than a threshold amount or at which there is a turning point in the measured degree of capacitive coupling). The changes do not necessarily need to be the greatest in magnitude for the amplitude data in each time window—that is, multiple changes in the amplitude data for each object may be assigned a time within the time window. The assigned time may correspond either to the point in time the changes are first detected or the point in time at which the maximum value for that change occurs—that is, the time may be at the beginning of a peak or at the crest of the peak (or any pre-set position in between). Accordingly, the processing circuitry 4C determines which change identified in the amplitude data is closest in time to the identified time in the displacement data; that is, a determination of the smallest absolute difference between $t_{Threshold}$ and $t_{event}$ for the amplitude data of each object 160. Hence, the object corresponding to the amplitude data containing the closest change is determined as the most probable object that applies the displacement load. This technique can help distinguish which object applied the load when the amplitude data of more than one object varies. Note that this technique can additionally be applied as a secondary check for any determination made according to the greatest/strongest change criteria discussed above.

Thus, in accordance with the principles described herein, an apparatus is configured to determine which of a variety of objects that are capacity coupled to a sensing surface provides a displacement force to the sensing surface. This is based on determining a change in a characteristic associated with the capacitive coupling around the time the displacement is detected. In the above-describe examples, the characteristic associated with the capacitive coupling is the magnitude of the coupling. At this to say, the object associated with the greatest change in the magnitude of passive coupling, or the object associated with a changing capacitive coupling which is nearest in time to the displacement, may be considered to be the object applying the force. However, in other examples different characteristics associated with the capacitive coupling of the respective objects may be used, for example based on observing a change in the areal extent of the capacitive couplings for the objects, or a change in the position of the objects. For example, when a user presses harder with one finger, one might expect the aerial extent of capacitive coupling associated with this finger to increase. Similarly, when a user presses with a finger this may be expected to slightly change the position of the finger. These changes may not be large enough to reliably detect a pressing finger in themselves, but can nonetheless be used to help distinguish among a plurality of potential pressing fingers when it is known that there has been a displacement (e.g. as detected by the displacement sensor). Accordingly, whichever object is associated with the greatest change in areal extent or centroid position around the time of a steady displacement may thus be considered to be the object applying the force to cause the displacement.

In this regard an indication of a change in areal extent of an object may be based on the spatial extent over which capacitive coupling is detected for the object, e.g. determined from the number of adjacent sensing nodes at which the object is detected. Accordingly, the amplitude data may represent an increase in areal extent over which an object is adjacent to the sensing surface as a function of time, for example caused by the object pressing harder, and so deforming, against the sensing surface 3A.

An indication of a change in centroid location for an object on the sensing surface 3A may be determined directly from the X, Y position data for the respective objects provided by the sensing element measurement circuitry 4A. For example, a similar approach to that described above with reference to FIG. 4B may be adopted, but where the amplitude data represented in FIG. 4B is replaced by an indication of a change in centroid position, rather than an indication of a change in capacitive coupling strength. The change in a position may be characterised, for example, by identifying changes in a moving mean position. Thus, in accordance with certain approaches, amplitude data representing a characteristic associated with the capacitive couplings of the object to the sensing surface may correspond with a measure of the extent to which a centroid location moves around the time of a detected displacement.

It should be appreciated that any combination of the above described amplitude data can be used in accordance with the principles of the present disclosure. In other words, the amplitude data may comprise a combination of both the strength of the capacitive coupling and the areal extent and/or the centroid location. In some cases, the use of two or more types of amplitude data may aid in disambiguating which object of a plurality of objects 160 applied the load causing the displacement of the capacitive sensing element 3.

It has been described above that the displacement sensing element measuring circuitry 4B outputs an indication of when displacement of the capacitive sensing element 3 passes a displacement threshold. However, in other examples, the displacement sensing element measuring circuitry 4B is configured to convert the output from the displacement sensor (using any suitable conversion) to displacement data indicative, either directly or indirectly, of the displacement distance d. In other words, the displacement sensing element measuring circuitry 4B outputs the displacement data of FIG. 4A to the processing circuitry 4C.

The conversion may be a conversion to an absolute value for a displacement, for example by converting an individual capacitance measurement (or average of multiple capacitance measurements) to a displacement offset based on a calibration function. The calibration function may, for example, be based on modelling or established in an initial setup procedure in accordance with conventional capacitance measurement techniques. In particular, a baseline value (corresponding to a measurement of the relevant capacitance characteristic of the deformable electrode when there is no displacement) may be established at various times, for example when the capacitive sensor is initially turned on. The calibration function may then be used to convert differences in capacitance measurement from the baseline measurement to corresponding displacements.

In this case, the processing circuitry 4C determines when the displacement threshold has been surpassed using the output displacement data. The processing circuitry 4C may then determine the time window in accordance with the techniques described above. However, in this case, the processing circuitry 4C may alternatively be configured to calculate the time window in an alternative manner. In this example, Δt can be dynamically set and may be based on the specific displacement data itself. For example, Δt can be set equal to time between an initial rise in the displacement data (i.e., an initial rise from a constant or approximately constant level) to $t_{Threshold}$. That is, Δt determined by subtracting the time at which the displacement data begins to change (which is conveniently shown by $t_1$ in FIG. 4A) from $t_{Threshold}$. In other cases, the time window may be set based only on when the displacement data first surpasses the displacement threshold ($t_{Threshold}$) and when it next falls below the displacement threshold. In yet other scenarios, the time window is not based on $t_{Threshold}$ at all, but is based on the total duration of the change in displacement; for example, the time window may be set to the time equal to a full duration at half maximum (FDHM) of a peak in the displacement data. The manner in which the time window is calculated is not particularly significant and can be performed in a number of ways with a mind to the specific application of the sensing apparatus.

Although it has been described above that the processing circuitry 4C determines when there is change in amplitude data based upon a change in the values of the amplitude data, in other implementations the processing circuitry 4C is configured to calculate and monitor the rate of change in both, or either of, the amplitude and displacement data—that is, the first derivatives with respect to time.

Rather than calculate when the displacement data itself surpasses a displacement threshold, the processing circuitry 4C analyses the first derivative with respect to time of the displacement data to determine any rapid and significant changes in the rate of change of displacement (i.e., the velocity of the capacitive sensing element 3). When the velocity is rapid and significant (i.e., surpasses a velocity threshold), this acts as a trigger for the processing circuitry 4C to determine which object/finger 160 applied the load to the sensing surface 3A. In this sense, the initial displacement of the capacitive sensing element 3 is less relevant because it is the velocity of the capacitive sensing element 3 that determines whether or not displacement has occurred. For instance, a purposeful or intentional force/load for selecting a function may be applied over a shorter time period (thus having a greater impulse) than an equivalent force applied by positioning fingers on the sensing surface 3A.

A time window can be determined as described in any of the ways above using the detected velocity as a reference time (i.e., as $t_{Threshold}$). The processing circuitry 4C may search the amplitude data in accordance with any of the techniques described above. In some cases, in addition to (or instead of) searching the amplitude data for a greatest change, the processing circuitry 4C searches a rate of change of amplitude data with respect to time (i.e., first derivate of the amplitude data) in the time window to determine the largest or most likely rapid and significant change in the derivative of the amplitude data. Accordingly, the object corresponding to the amplitude data having the appropriate rate of change is determined to be the object that applies the displacement load.

In a further example implementation, the processing circuitry 4C additionally calculates the rate of the rate of change for the displacement and/or amplitude data (i.e., the second derivatives with respect to time). This can be processed in a similar manner to the first derivatives described above and a further explanation is not given here for brevity. Using the second derivatives can provide further accuracy and refinement for the determination of the appropriate object applying the displacement load.

Although it has been described above that displacement of the capacitive sensing element 3 is determined based on when displacement data crosses or surpasses a displacement threshold, in a further implementation the processing circuitry 4C is configured to determine a change within the displacement data.

Figure 5A:
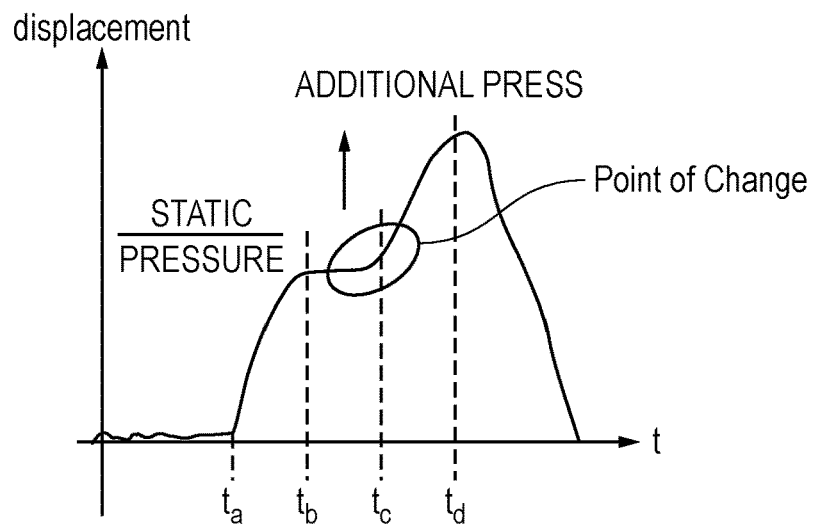
FIG. 5A is a graph of exemplary displacement data measured by the displacement sensor of the sensing apparatus of FIGS. 1, 2 and 3 as a function of time when a first object applies a first load at a first time and a second object applies an additional load during application of the first load.
Figure 5B:
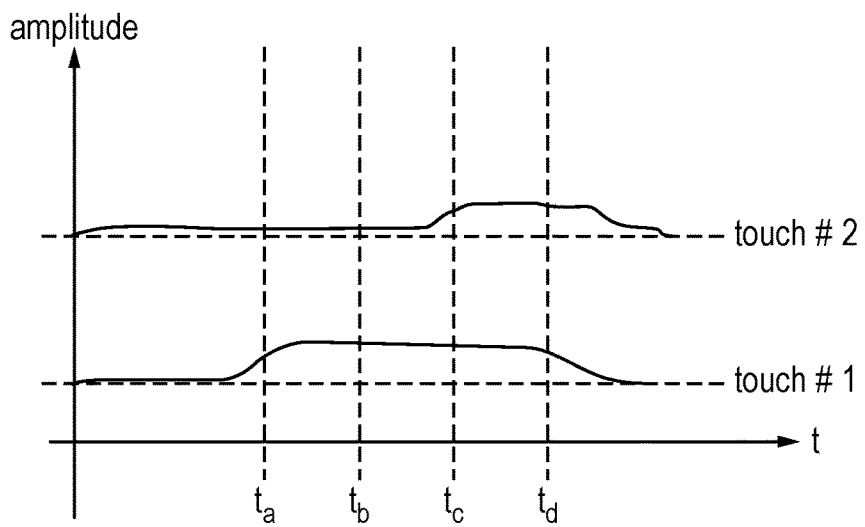
FIG. 5B is a graph of exemplary capacitive coupling data representing a degree of capacitive coupling between respective ones of a plurality of objects over the sensing surface measured by the capacitive sensor of the sensing apparatus of FIGS. 1, 2 and 3 during the same time period as represented in FIG. 5A.
Figure 5C:
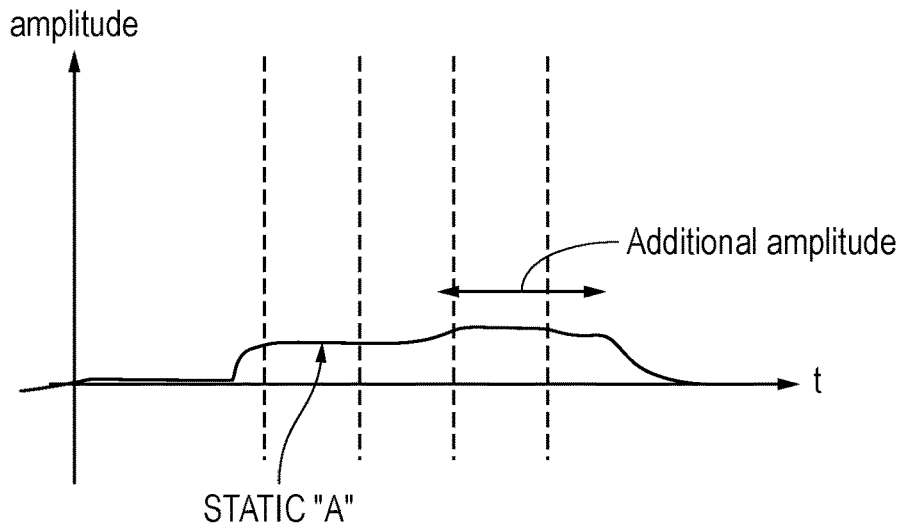
FIG. 5C is a graph of exemplary capacitive coupling data representing a total degree of capacitive coupling for a combination of a plurality of objects over the sensing surface measured by the capacitive sensing element of the sensing apparatus of FIGS. 1 and 2 during the same time period as represented in FIG. 5A.

FIGS. 5A, 5B, and 5C show the situation where two of the plurality of objects perform input selections on the touch sensitive input at different times. For example, such a scenario may occur when a user wishes to input a first command, e.g., the SHIFT key on a keyboard, and while inputting the first command, input another command shortly after, e.g., pressing the letter "a" on a keyboard.

FIG. 5A schematically represents the measured displacement of the capacitive sensing element 3 as a function of time (i.e. displacement data) during a period in which the capacitive sensing element 3 undergoes a two-stage displacement. Time extends across the horizontal axis and the measured displacement determined by the displacement sensing element measuring circuitry 4B is recorded on the vertical axis in arbitrary units. As can be seen the displacement starts to occur at time $t_a$, rises until a time $t_b$ where it remains constant (plateaus) until a time $t_c$ where the displacement begins to increase until a maximum displacement achieved at time $t_d$ at which point the user stops pressing. After $t_d$ the displacement returns to zero.

FIG. 5B schematically represents the output from the capacitive sensing element measuring circuitry 4A (i.e. amplitude data) as a function of time during the same period as represented in FIG. 5A (i.e. when a user applies a displacement load to the sensing surface 3A). There are two traces shown in FIG. 5B showing the degree of capacitive coupling (amplitude/strength) associated with each of the two objects (touches) detected by the capacitive sensing element measuring circuitry 4A as a function of time. Time extends across the horizontal axis and the measured degree of capacitive coupling for each object is recorded on the vertical axis in arbitrary units and with respectively offset horizontal axes indicated by dotted lines.

FIG. 5C schematically represents a summation of the outputs from the capacitive sensing element measuring circuitry 4A as a function of time for each object in FIG. 5B. Time extends across the horizontal axis and the total degree of capacitive coupling for all detected objects is recorded on the vertical axis in arbitrary units.

As mentioned above, in the example scenario of FIGS. 5A to 5C, a user rests two objects/fingers on the sensing surface 3A of the capacitive sensing element 3. Before time $t_a$, there is no displacement and relatively little capacitive coupling between the objects and the sensing surface 3A. At time $t_a$, the user presses with a first object on the sensing surface 3A to input a suitable command to the device coupled to the sensing apparatus 1. For example, the user may input a "SHIFT" function/command by pressing with an object/finger at the relevant X, Y location on the sensing surface 3A.

As a result of pressing on the sensing surface 3A using the first object, the capacitive sensing element 3 is displaced in the displacement direction by a first displacement. This is shown in FIG. 5A where the displacement steadily rises from time $t_a$ to time $t_b$. At time $t_b$ the displacement plateaus until time $t_c$, which may be because the user presses the sensing surface 3A with the desired level of force to input the desired function/command (i.e., pressing the "SHIFT" key) or because the user applies a maximum level of force they can achieve using that object.

During the time from $t_a$ to $t_c$, the first object pressing on the sensing surface 3A first increases and then maintains its capacitive coupling with the capacitive sensing element 3. Essentially, this is for the reasons as described above, e.g., the object is relatively closer to the electrodes of the capacitive sensing element 3 when a load is applied. The capacitive coupling reaches a first amplitude which is determined by the force applied and the physiology of the object/finger. FIG. 5B shows the capacitive coupling (amplitude data) for touch #1 (which corresponds to the first object). As can be seen, the amplitude value is approximately constant for the period between $t_a$ and $t_c$. With reference to FIG. 5C, the total amplitude value (i.e., the summation of the amplitude values for all detected touches) in the period between $t_a$ and $t_b$ is approximately the same as the amplitude data for touch #1 in FIG. 5B because the second object is not applying a pressing force to (and in this example is therefore not capacitively coupled to) the sensing surface 3A.

The processing circuitry 4C is, in this implementation, configured to determine which of the plurality of objects applies the displacement load using any of the above mentioned techniques. In other words, the processing circuitry 4C can determine a time window in which to search the amplitude data relating to all the plurality of sensed objects and determine which of the objects applied the load. The time window in this example might be set to $t_b \pm \Delta t$ for example, where $\Delta t$ is less than the difference between $t_b$ and $t_c$ in this example.

At time $t_c$, the user applies an additional load to the sensing surface 3A. In the present example, the additional load is applied by a different object while the sensing surface 3A continues to be pressed by the first object. As the user applies an additional force/load with the second object, the displacement of the capacitive sensing element 3 increases above the plateaued level between times $t_b$ and $t_c$. In other words, there is a point of change in the displacement data at time $t_c$ where the displacement of the capacitive sensing element 3 is displaced further from an already (partially) displaced state.

With reference to FIG. 5B, the capacitive coupling between the second object and the sensing surface 3A, i.e., amplitude data corresponding to touch #2, rises from time $t_c$ and is constant until a time approximately at $t_d$ or shortly thereafter. The actual amplitude (i.e., the value in the y-axis of FIG. 5B) can take any value but, for the purposes of this explanation, it is assumed that the value is equal to or less than the amplitude value of the amplitude data corresponding to touch #1.

The point of change is detected by the processing circuitry 4C and, as a result, the processing circuitry 4C defines a second time window to search the amplitude data and identify which object/touch applied the additional load. The processing circuitry 4C is configured to identify the greatest change in the amplitude data in the second time window as described above. For example, the time window might be set to $t_c \pm \Delta t$. However, when searching in this time window, the maximum amplitude value is actually seen in the amplitude data of touch #1 despite the fact that it is touch #2 that applies the additional load. Therefore, within this time window, the greatest change in amplitude value from an initial zero level (or indeed, from historical values prior to $t_a$) would show that touch #1 applied the additional pressure.

In this case, the processing circuitry 4C can be configured to disambiguate which object applied the touch. For example, the processing circuitry 4C may compare values for the amplitude data within the second time window. For example, suppose the second time window is defined between $t_b$ and $t_d$. The processing circuitry 4C is configured in this case to compare a value in the amplitude data at time $t_b$ with a value in the amplitude data at a time $t_d$ for touch #1 and for touch #2. In this case, the difference between the amplitude values at $t_b$ and $t_d$ for touch #1 is approximately zero, while the difference between the amplitude values at $t_b$ and $t_d$ for touch #2 is not zero. In this way, particularly when there is a point of change in the displacement data, the processing circuitry 4C is configured to disambiguate which of the touch points applied the additional pressure using a more refined algorithm than described previously.

The above describes an algorithm that compares amplitude values in one set of amplitude data within a second time window defined according to a detected point of change in the displacement data where the displacement data suddenly changes. However, it should be appreciated that the processing circuitry 4C may be configured in alternative ways. For example, the processing circuitry 4C may be configured to compute the first derivative with respect to time of the amplitude data and look for changes within the first derivatives. In the above example, the first derivative of the amplitude data for touch #1 would be approximately zero, whereas the first derivative of the amplitude data for touch #2 would display some change.

As already noted, it will be appreciated the specific nature of the capacitive sensing technique is not significant to the principles described herein. For example, in some embodiments of the present disclosure, the sensing surface 3A of the capacitive sensing element 3 is split into multiple sections. This can be realised either by providing separate sets of electrodes in the capacitive sensing element 3 (e.g., by having four independent sets of electrodes arranged in quartiles of the sensing surface 3A) wherein the sensing surface 3A can tilt about axes relative to the frame 2, or by physically splitting the sensing surface 3A into multiple sections that are configured to independently move relative to one another.

In this case, the displacement sensor element may be configured to provide indications of capacitances in different regions of the capacitive sensing element 3, which can be converted into displacements. In other words, the displacement sensor may be configured to detect a tilt/relative motion of sections of the capacitive sensing element 3. Advantageously, processing resources required to search through the amplitude data can be reduced using this embodiment because only amplitude data of objects corresponding to the section(s) which are displaced are searched in the processing circuitry 4C. For example, with reference to FIG. 1 and assuming the sensing surface 3A is split into upper and lower, and left and right quarters, if only the top right quarter of the sensing surface 3A is displaced beyond the displacement threshold, then only the amplitude data relating to the index finger and middle finger are required to be searched because only one of these objects has applied the additional displacement load. In this scenario, the thumb is in the lower right quarter of the sensing surface 3A while the ring and little fingers are present in the upper left quarter. Therefore, the application of additional pressure/load can be more reliably attributed to an object while reducing processing time and resources.

While a specific displacement sensor based upon measuring capacitance couplings is described, it should be appreciated that other types of displacement sensor, e.g., optical/laser based, inductance based, a mechanical button, etc., and equivalent displacement sensing element measuring circuitry 4B can be used in alternative implementations in accordance with the principles of the present disclosure.

While it has been described that the processing circuitry 4C determines the most likely/probable touch applying the displacement load it should be appreciated that the processing circuitry 4C may be configured to determine a number of objects (e.g., two) as the most probable/likely objects applying the displacement load. For example, in some applications, a user may be required to input a command using two or more fingers, wherein performing the same action with a single finger selects a different command. In this way, the processing circuitry 4C can be arranged to determine a plurality of the plurality of sensed objects as the most probable objects that apply the displacement load. This can be achieved using any of the above described techniques for analysing the amplitude data and determining a single object as the most likely object that applies the displacement load, but instead of outputting the position data (i.e., X, Y coordinate) or pressure data for only one object, the processing circuitry 4C outputs a plurality of data. In one implementation, the processing circuitry 4C selects the most probable object from the sensed objects and thereafter determines the next most probable object that applies the displacement load from the remaining objects, and so on for the desired number of objects. Alternatively, pressure may be apportioned between the sensed touches/objects as described above and an algorithm for determining which of the touches applies the greatest proportion of the displacement load as the objects that apply the displacement load can be used. In this way, using the above techniques, the processing circuitry 4C can output data (X, Y position data, and/or pressure data) for a plurality of objects. The device to which the sensing apparatus 1 is coupled can use this data in a conventional way, as described above. More specifically, the device can process the data to determine if a genuine two (or more) finger touch has been performed.

It should also be understood that the processing circuitry 4C is configured to stop outputting the position and/or pressure data for a relevant touch when the displacement of the capacitive sensing element 3 goes from surpassing the threshold to below the threshold—i.e., when the user stops applying a sufficient displacement load. Therefore, the device to which the sensing apparatus 1 is coupled does not receive an X. Y position and does not compare this to, e.g., position ranges corresponding to a function/command to be input. Hence, the device to which the sensing apparatus 1 stops performing the function/command initiated prior to the displacement of the capacitive sensing element 3 falling below the threshold.

Thus there has been described a sensing apparatus including a frame; a capacitive sensor comprising a sensing surface moveably mounted relative to the frame and configured to measure, as a function of time, characteristics of capacitive couplings between the sensing surface and a plurality of objects at different locations over the sensing surface; a displacement sensor configured to detect when there is a displacement of the sensing surface relative to the frame due to a displacement load applied to the sensing surface by one of the objects; and a processing element configured to identify which of the objects applied the displacement load based on changes in the measured characteristics of the capacitive couplings for the respective objects during a time period around when the displacement of the sensing surface is detected.

The systems described above make use of both displacement data and amplitude data corresponding to each object detected on a sensing surface to determine which of the objects applies an additional load. Generally, a change in displacement data is used as a trigger to search the corresponding amplitude data for changes therein within a defined time window.

Further particular and preferred aspects of the present invention are set out in the accompanying independent and dependent claims. It will be appreciated that features of the dependent claims may be combined with features of the independent claims in combinations other than those explicitly set out in the claims.

REFERENCES

[1] Capacitive Sensors: Design and Applications by Larry K. Baxter, August 1996, Wiley-IEEE Press, ISBN: 978-0-7803-5351-0

What is claimed is:

1. A sensing apparatus comprising:
   a frame;
   a capacitive sensor comprising a sensing surface displaceably mounted relative to the frame and configured to measure, as a function of time, characteristics of capacitive couplings between the sensing surface and a plurality of objects at different locations over the sensing surface;
   a displacement sensor disposed between the capacitive sensor and the frame and configured to detect when there is a displacement of the sensing surface relative to the frame due to a displacement load applied to the sensing surface by one or more of the plurality of objects; and
   determine, using a controller, a displacement time period determined based on when the detected displacement load exceeds a threshold detection level, and
   identify, within the displacement time period, which one or more of the plurality of objects applied the displacement load based on changes in the measured characteristics of the capacitive couplings for the respective plurality of objects.

2. The sensing apparatus of claim 1, wherein the characteristics of capacitive couplings between the sensing surface and respective ones of the objects comprises indications of magnitudes for the respective capacitive couplings.

3. The sensing apparatus of claim 1, wherein the characteristics of capacitive couplings between the sensing surface and respective ones of the objects comprises indications of areal extents over the sensing surface for the respective capacitive couplings.

4. The sensing apparatus of claim 1, wherein the characteristics of capacitive couplings between the sensing surface and respective ones of the objects comprises indications of centroid locations over the sensing surface for the respective capacitive couplings.

5. The sensing apparatus of claim 1, wherein the displacement time period includes the time the change in displacement of the sensing surface is detected.

6. The sensing apparatus of claim 1, wherein the displacement time period includes times before the change in displacement of the sensing surface is detected.

7. The sensing apparatus of claim 1, wherein the controller is used to further identify which of the objects applied the displacement load by identifying which of the objects is associated with the greatest change in the measured characteristics of the capacitive couplings during the displacement time period.

8. The sensing apparatus of claim 1, wherein the controller is used to further identify which of the objects applied the displacement load by identifying which of the objects are associated with a change in the measured characteristics of the capacitive couplings during the displacement time period which exceeds the threshold detection level.

9. The sensing apparatus of claim 8, wherein the controller is used to further identify one of the objects as the object that applied the displacement load from a group of objects associated with a change in the measured characteristics of the capacitive couplings that exceeds the threshold detection level during the time displacement period by identifying which of group of the objects is associated with capacitive couplings indicating the greatest change in centroid location over the sensing surface during the displacement time period.

10. The sensing apparatus of claim 1, wherein the controller is used to further identify which of the objects applied the displacement load by identifying which of the objects is associated with a change in the measured characteristics of the capacitive couplings which is nearest in time to the time when a displacement of the sensing surface is detected.

11. The sensing apparatus of claim 1, wherein the changes in the measured characteristics of the capacitive couplings during the displacement time period comprise first and/or second order derivative of the measured characteristics of the capacitive couplings with respect to time.

12. The sensing apparatus of claim 1, wherein the displacement sensor is configured to determine when there is a displacement of the sensing surface by determining when there is a displacement of the sensing surface relative to the frame greater than a threshold displacement.

13. The sensing apparatus of claim 12, wherein the threshold displacement depends on the number of objects identified over the sensing surface.

14. The sensing apparatus of claim 1, wherein the displacement sensor is configured to determine when there is a displacement of the sensing surface by taking account of a first and/or second order derivative of a measured displacement with respect to time.

15. The sensing apparatus of claim 1, wherein the displacement sensor is a capacitive sensing based displacement sensor.

16. The sensing apparatus of claim 1, wherein the sensing surface is formed of two or more sections, each section moveably mounted relative to the frame and to the remaining sections, and wherein the displacement sensor is configured to detect when there is a displacement of one or more of the sections of the sensing surface relative to the frame due to the displacement load applied.

17. The sensing apparatus of claim 16, wherein the controller is used to further identify which of the sections is displaced and which of the objects applied the displacement load based on changes in the measured characteristics of the capacitive couplings associated with the identified section for the respective objects detected.

18. A method of operating a sensing apparatus comprising a frame, a controller, and a capacitive sensor including a sensing surface moveably mounted relative to the frame to identify which of a plurality of objects at different locations over the sensing surface applies a displacement load to the sensing surface, the method comprising:

measuring, as a function of time, characteristics of capacitive couplings between the sensing surface and the plurality of objects at the different locations over the sensing surface;

detecting, using a displacement sensor disposed between the capacitive sensor and the frame, when there is a displacement of the sensing surface relative to the frame due to the displacement load applied to the sensing surface by one of the objects; and determining, using the controller, a displacement time period determined based on when the detected displacement load exceeds a threshold detection level, and identifying, by the controller and within the displacement time period which of the one or more objects applied the displacement load based on changes in the measured characteristics of the capacitive couplings for the respective plurality of objects.

\* \* \* \* \*